Feb. 6, 1940.   C. H. BELL   2,189,414
MATERIAL TREATING APPARATUS
Filed Oct. 2, 1937
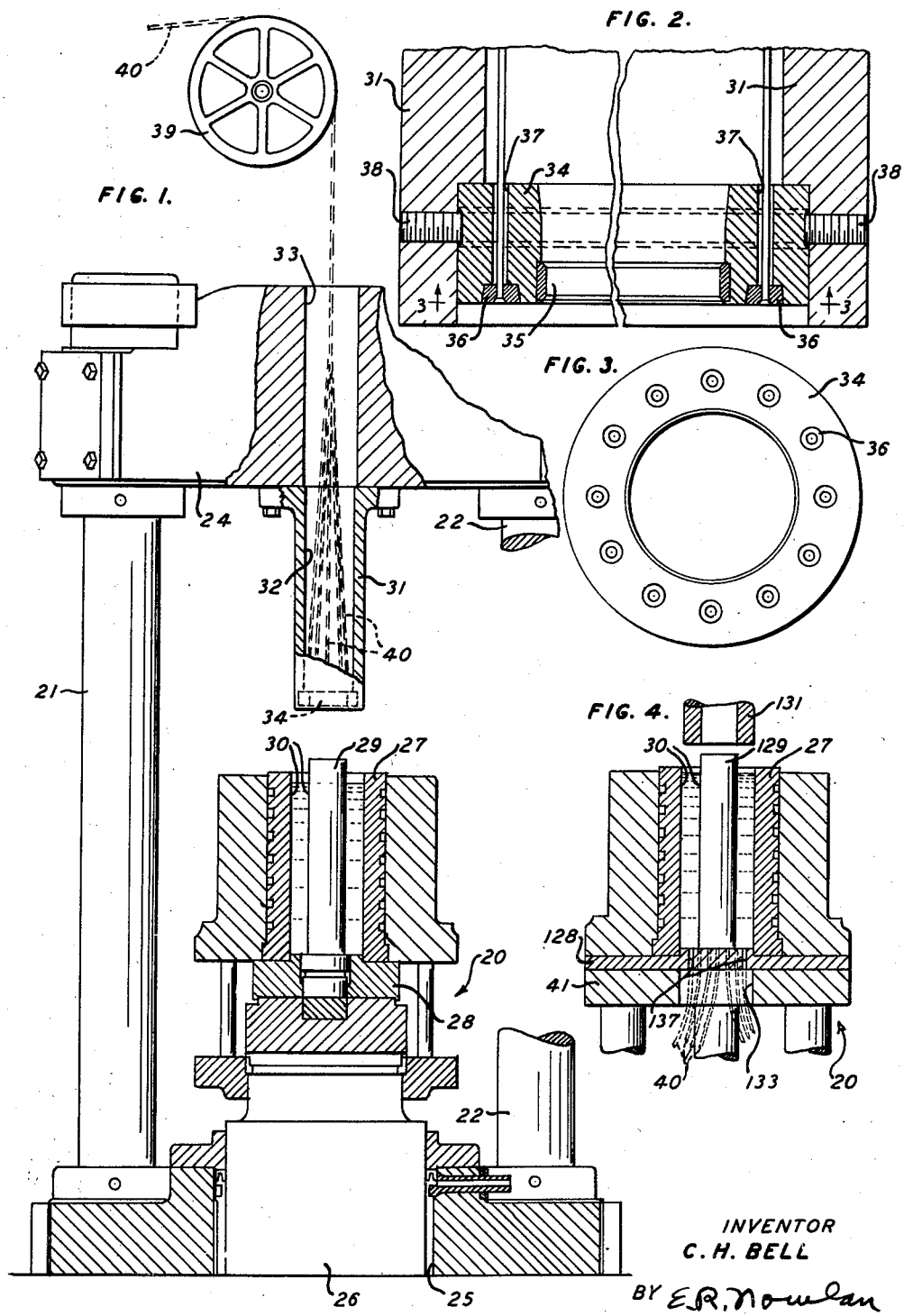
INVENTOR
C. H. BELL
BY E. R. Nowlan
ATTORNEY Patented Feb. 6, 1940

2,189,414

UNITED STATES PATENT OFFICE 2,189,414

MATERIAL TREATING APPARATUS

Charles H. Bell, Westfield, N. J., assignor to Nassau Smelting and Refining Company, Incorporated, New York, N. Y., a corporation of New York Application October 2, 1937, Serial No. 166,956

3 Claims. (Cl. 207—3)

This invention relates to material treating apparatus and more particularly to apparatus for converting material into strand form.

A common and well known method of converting a large variety of materials into strands is that known as "extrusion", i. e. subjecting the material in a rigid container having one or more appropriately shaped apertures, to pressure whereby the material is squeezed out or "extruded" through the aperture or apertures in the form of strands, whose size and cross-sectional form will be determined by the size and shape of the apertures. The apparatus or "extrusion press" ordinarily used for this purpose comprises a hydraulic press, with the container or "extrusion cylinder" mounted on one of the principal press members and a ram adapted to fit closely into the cylinder mounted on the other press member to be driven thereby into the cylinder. Material placed in the cylinder will thus be extruded by the coaction of the ram and cylinder through one or more appropriate apertures formed in the cylinder or the ram. Materials to be thus treated may be of a wide variety of kinds, e. g. the softer metals, lead, lead-antimony alloys, other alloys of lead, solders, alloys of tin, plastic materials such as Celluloid, the artificial resins and the like, viscous solutions or pastes with volatile solvents, in short practically any substance or compound which will flow under the conditions of temperature and pressure practicable within the cylinder.

Since the material to be extruded is extruded by plastic flow under pressure it is evident that the material in the cylinder of such an apparatus is, in effect, a liquid during the extrusion although it may be a very stiff and viscous one. Hence the material is then subject to the laws of hydrostatic pressure and so exerts its pressure in all directions against its confining walls. In particular, is this pressure exerted against the entire wall in which the extrusion apertures are formed, and material in contact with, or near to this wall at points remote from the apertures must move more or less parallel to the wall to reach the apertures and escape. Since the materials are usually stiffly viscous in nature, this flow entails pressures considerably in excess of that actually required for the extrusion itself.

An object of the present invention is to produce an apparatus for extruding strand material in which the ratio of cross-section of extrusion aperture to solid area in the extrusion wall of the container is made as high as practicably may be, to the end that the extrusion pressure and thereby the strain on the apparatus may be materially diminished.

With the above and other objects in view, one embodiment of the invention contemplates an extrusion apparatus having a pair of complementary, coacting, annular, extrusion members which define an annular extrusion wall provided with a plurality of extrusion apertures.

Other objects and features of the invention will appear from the following detailed description of embodiments thereof taken in connection with the accompanying drawing in which the same reference numerals are applied to identical parts in the several figures and in which Fig. 1 is a broken view in elevation and partly in section of an apparatus for converting material into strand form, embodying the invention;

Fig. 2 is an enlarged broken sectional view of the ram;

Fig. 3 is a detached plan view of the die collar, and

Fig. 4 is a partial vertical sectional view of a modified form of the apparatus.

The embodiment of the invention disclosed in Figs. 1, 2 and 3 shows a hydraulic extrusion press of generally conventional form and structure modified as described below to embody the invention. The press comprises a base, generally indicated at 20, to which are secured the lower ends of a pair of vertical pillar guides 21, 22, and a yoke 24 immovably secured across the tops of the pillars. The base structure includes a hydraulic cylinder 25 and piston 26, of any suitable and well known construction. Upon the piston 26 is mounted an extrusion cylinder 27 upon a base 28. All the above is generally and in detail of any appropriate and well known structure. There is no extrusion aperture or other outlet from the cylinder 27 except the upper opening thereof.

Coaxially within the cylinder 27 is located a vertical, solid, cylindrical core 29, preferably rigidly mounted in the base 28, so proportioned and arranged within the cylinder as to define therewith a circularly annular extrusion chamber 30.

A depending cylindrical extrusion ram 31 is rigidly mounted on the under side of the yoke 24 to be coaxial with the chamber 30, and is of exterior diameter to fit snugly into the outer wall of the chamber. The ram 31 has a vertical coaxial bore 32 considerably larger in diameter than the core 29, so that when the cylinder 27 is raised by the action of the hydraulic cylinder 25 and piston 26, the ram 31 fits tightly enough into the cylinder 27 to prevent the passage of any substantial quantity of material contained in the chamber 30 between the ram 31 and the cylinder 27, while an annular space is left between the core 29 and the ram 31. Furthermore a suitable passageway 33 is formed in the yoke 24 coaxial with the bore 32.

A die collar 34 is rigidly mounted in the ram 31 and within the bore 32 near the bottom end of the ram. This collar is preferably removably so mounted in order to be readily interchanged in case of breakage or when a collar of other dimensions is desired. For similar reasons the core 29 is also arranged to be removably mounted in the base 28.

The die collar 34 is preferably a little larger in internal diameter than its corresponding core 29 and is provided with a preferably stainless steel closure ring 35 whose internal diameter is such as to fit snugly yet slidably around the core 29. A plurality of extrusion dies 36 is set into the under face of the die collar 34 in a circle concentric with the axis of the collar. Each such die 36 is in form a truncated cone with an axial bore to pass and shape material from the chamber 30. The die collar is formed with passage 37 leading vertically up from each of the bores of the several dies 36. The die collar 34 may conveniently be held in place in the ram 31 by jam screws 38. In describing the operation, let it be assumed that the apparatus is to be used to convert solder, such as the familiar mixture or alloy of equal parts of lead and tin, into strand or wire form. With the parts in the position shown in Fig. 1, the chamber 30 may be filled with molten solder substantially to the top. The press is then set in motion to bring the cylinder 27 up to meet and coact with the ram 31. As the cylinder is forced up along the ram, the solder in the cylinder 27 is put under heavy pressure and escapes from the chamber 30 by passing up through the bores of the dies 36 in the form of strands. The temperature of the material in the chamber 30 being within the range found to be satisfactory for the material in question, in the case of the solder mentioned about 400° F. more or less, the material emerges from the dies as solid strands 40 and may be led away by any convenient means such as a multigrooved roller 39 to be coiled for storage or otherwise treated.

In the modified form disclosed in Fig. 4, the block 41 on which the base 128 of the cylinder 27 rests is centrally perforated with a passageway 133, and the base 128 is provided with a ring of vertical perforations 137. The ram 131, in this instance is then a hollow cylinder dimensioned to just fit the chamber 30, and the strands 40 of material are extruded downwardly from the chamber 30 through the perforations 137 and the passageway 133. The perforations 137 will preferably be provided at their upper ends with dies such as 36, although these may be omitted as shown.

A characterizing feature of the invention as shown is that the extrusion chamber 30 is annular in cross-section and coacts with an annular ram 31 or 131, whereby the ring 34 with its dies 36 or the annular portion of the surface of the base 128 with the perforations 137 exposed to the pressure of the extrusion charge presents a relatively high ratio of aperture cross-section to obstructive supporting parts, while no part of the ring 34 or of the annular portion of the base 128 exposed to the pressure of the extrusion charge is at a greater distance from means to support it against that pressure than less than the breadth of the ring or annular portion. Thus the unsupported stresses on the die carrying member are materially lessened as compared with an arrangement not having some central member such as 29 or 129.

While the chamber 30 is here shown as circularly annular in cross-section, it obviously may have any other annular form desired. The embodiments of the invention herein disclosed are illustrative only and may be modified and departed from in many ways without departing from the spirit and scope of the invention as pointed out in and limited solely by the appended claims.

What is claimed is:

1. In an extrusion press to simultaneously extrude a plurality of strands, an extrusion cylinder having a chamber of annular cross section, in combination with a ram of annular cross section to enter the annular chamber, the ram being provided at the end thereof which enters the annular chamber with an annular plurality of extrusion apertures.

2. In an extrusion press to simultaneously extrude a plurality of strands, an extrusion cylinder, and a core positioned coaxially within the cylinder to form an extrusion chamber of annular cross section between the core and the cylinder, in combination with a ram of annular cross section to enter the annular chamber and to receive the core therein, the ram being provided at the end thereof which enters the annular chamber with an annular plurality of extrusion apertures.

3. In an extrusion press to simultaneously extrude a plurality of strands, an extrusion cylinder, and a core positioned coaxially within the cylinder to form an extrusion chamber of annular cross section between the core and the cylinder, in combination with a ram of annular cross section of less thickness of wall than the width of the annular chamber to enter the annular chamber and to receive the core therein and an extrusion die annulus mounted in the end of the ram which enters the chamber and of such width as with the ram will close the chamber, the die annulus being provided with an annular plurality of extrusion apertures.

CHARLES H. BELL.